(12) United States Patent
Ostrander et al.

(10) Patent No.: US 9,193,626 B2
(45) Date of Patent: Nov. 24, 2015

(54) CALCIUM ALUMINATE CEMENT

(71) Applicant: CALUCEM GMBH, Mannheim (DE)

(72) Inventors: Douglas Ostrander, Allentown, PA (US); Markus Schmid, Lauf a.d. Peg. (DE)

(73) Assignee: CALUCEM GMBH, Mannheim (DE)

( * ) Notice: Subject to any disclaimer, the term of this patent is extended or adjusted under 35 U.S.C. 154(b) by 0 days.

(21) Appl. No.: 14/278,125

(22) Filed: May 15, 2014

(65) Prior Publication Data

US 2014/0338569 A1    Nov. 20, 2014

Related U.S. Application Data

(60) Provisional application No. 61/823,543, filed on May 15, 2013.

(30) Foreign Application Priority Data

Jun. 28, 2013 (EP) .................................. 13003310

(51) Int. Cl.

| | |
|---|---|
| *C04B 7/32* | (2006.01) |
| *C04B 7/36* | (2006.01) |
| *C04B 9/11* | (2006.01) |
| *C04B 11/28* | (2006.01) |
| *C04B 28/06* | (2006.01) |
| *C04B 41/50* | (2006.01) |
| *C04B 111/00* | (2006.01) |
| *C04B 111/10* | (2006.01) |

(52) U.S. Cl.
CPC . *C04B 7/32* (2013.01); *C04B 28/06* (2013.01); *C04B 41/508* (2013.01); *C04B 2111/00215* (2013.01); *C04B 2111/00431* (2013.01); *C04B 2111/00637* (2013.01); *C04B 2111/00672* (2013.01); *C04B 2111/10* (2013.01)

(58) Field of Classification Search
CPC .......... C04B 28/06; C04B 7/32; C04B 41/508
See application file for complete search history.

(56) References Cited

U.S. PATENT DOCUMENTS

| | | | |
|---|---|---|---|
| 2,407,135 | A | 9/1946 | Clark |
| 3,150,992 | A | 9/1964 | Crowley |
| 3,963,508 | A | 6/1976 | Masaryk |
| 4,217,144 | A | 8/1980 | Mathieu |
| 2010/0175588 | A1 | 7/2010 | Schorr et al. |

FOREIGN PATENT DOCUMENTS

| | | |
|---|---|---|
| CN | 1982247 A | 6/2007 |
| CN | 101113082 A | 1/2008 |
| CN | 101602581 A | 12/2009 |
| DE | 437 186 C | 11/1926 |
| DE | 26 49 032 B1 | 4/1978 |
| DE | 10 2009 014 886 B3 | 12/2010 |
| EP | 1 614 670 A2 | 1/2006 |
| JP | S 62-167241 A | 7/1987 |
| JP | H 7-97243 A | 4/1995 |
| JP | 7-232941 A | 9/1995 |
| JP | 2005-112709 A | 4/2005 |
| JP | 2005-162566 A | 6/2005 |
| JP | 2010-52983 A | 3/2010 |

OTHER PUBLICATIONS

English translation of Japanese Office Action, Appl. No. 2014-099487, Jul. 7, 2014, 2 pgs.
Third Party Observation for Application No. EP20130003310, Jun. 25, 2015, 4 pgs.
Chinese Office Action and Search Report, Appl. No. 201410193311.4, Sep. 6, 2015, 10 pgs.
European Search Report, Appl. No. 13003310.3, Jan. 8, 2014, 6 pgs.
Hewlett. P.C., Lea's Chemistry of Cement and Concrete, Elsevier Butterworth-Heinemann, Oxford OX2 8DP, Burlington, MA 01803, XP002718083, ISBN: 0 7506 6256 5, vol. 4 (2004), pp. 771-775.

*Primary Examiner* — Kaj K Olsen
*Assistant Examiner* — Karam Hijji
(74) *Attorney, Agent, or Firm* — Paul D. Strain, Esq.; Strain & Strain PLLC

(57) ABSTRACT

The present invention relates to a white calcium aluminate cement containing at least 90% by weight of monocalcium aluminate, an A/C value in the range of 1.75 to 2.0, a fineness according to Blaine in the range of 3500 to 6000 cm²/g, a slope n in the range of 1.1 to 1.5 and a location parameter x' of 8-20 μm in an RRSB particle size grid according to DIN 66145 as well as its use in formulations of the construction chemical industry and the refractory industry.

21 Claims, No Drawings

CALCIUM ALUMINATE CEMENT

CROSS-REFERENCE TO RELATED PATENT APPLICATIONS

This application is based upon and claims the benefit of priority from prior U.S. Provisional Patent Application No. 61/823,543, filed May 15, 2013, and European Patent Application No. 13003310.3, filed Jun. 28, 2013, the entire contents of all of which are incorporated herein by reference in their entirety.

The present invention relates to a calcium aluminate cement.

The first calcium aluminate cement, containing iron and manufactured in a smelting process, the "Ciment Fondu Lafarge" was first sold in 1918. Calcium aluminate cements were first standardised in EN 14647 in 2006. Due to its considerably high aluminate content in comparison to Portland cement, it was initially referred to as High Alumina Cement in English-speaking countries. In Germany it was and is referred to as "Tonerdezement". In literature the term calcium aluminate cement is now generally used analogously to Portland cements, which are calcium silicate cements.

Commercially available calcium aluminate cements normally cover an aluminium oxide range of 36-85% by weight. They can be produced either by way of the smelting or the sintering process. The different types of calcium aluminate cement can be effectively categorised in the groups rich in iron, low in iron and iron-free.

Typical calcium aluminate cements that are rich in iron are produced by means of the smelting process, have a grey to black-grey colour and can be characterised by their chemical composition as follows: 36-42% $Al_2O_3$, 2-6% $SiO_2$, 14-19% $Fe_2O_3$, 37-40% CaO and less than 1.5% MgO as well as less than 0.4% $SO_3$.

Calcium aluminate cements that are low in iron are coloured beige to grey and typically contain:
50-55% $Al_2O_3$, 2-6% $SiO_2$, 1-3% $Fe_2O_3$, 37-40% CaO and less than 1.5% MgO as well as less than 0.4% $SO_3$.

Calcium aluminate cements that are free of iron are not included in EN 14647, are white in colour and have varying degrees of lightness or whiteness, are usually produced by way of the sintering process, can contain added $Al_2O_3$ and therefore have the following, typical compositions: 68-85% $Al_2O_3$, <1% $SiO_2$, <0.5% $Fe_2O_3$, 26-31% CaO.

It is therefore clear that the colour of calcium aluminate cements becomes darker the higher their iron content.

When manufacturing calcium aluminate cements, the following mineral phases form, depending on the selected ratio of aluminium oxide to calcium oxide:

in calcium aluminate cement with a high iron content: Monocalcium aluminate (CA), brownmillerite ($C_4AF$), belite ($C_2S$), gehlenite ($C_2AS$), mayenite ($C_{12}A_7$) and perovskite (CT)

in calcium aluminate cement types with a low iron content: CA, $C_2AS$, CT, $C_{12}A_7$ and in iron-free calcium aluminate cement: CA, $CA_2$, $C_{12}A_7$, A.

Thereby the following applies in accordance with the chemical cement abbreviations:
C: CaO; A: $Al_2O_3$; F: $Fe_2O_3$; H: $H_2O$; $AH_3$: $2Al(OH)_3$; S: $SiO_2$; and T: $TiO_2$.
For further information on the chemical and mineralogical composition of calcium aluminate cements refer, for example, to Taylor, "Cement Chemistry", 2nd edition, page 296 and "Lea's Chemistry of Cement and Concrete", 4th edition, 2004, page 716ff.

The monocalcium aluminate phase CA is mainly responsible for the special hydraulic properties of the calcium aluminate cements, i.e. for their very high early strength development in comparison to high-quality Portland cement types, especially over a period of some hours. The reaction of the $CA_2$ in calcium aluminate cements that contain higher levels of $Al_2O_3$ with water is very slow. The phases CA and, if included, $C_{12}A_7$, are the only phases in calcium aluminate cements that react quickly with water; refer, for example, to Taylor, "Cement Chemistry", 2nd edition page 298 and "Lea's Chemistry of Cement and Concrete", 4th edition 2004, page 727. In principle it can be stated that the reactivity of calcium aluminates with water increases with an increase in the mol ratio C/A as shown in the following Table 1

TABLE 1

Relative hydraulic reactivity of calcium aluminates

| Calcium aluminate | Mol ratio C/A | Relative reactivity |
|---|---|---|
| $C_3A$ | 3.0 | Very high |
| $C_{12}A_7$ | 1.7 | Very high |
| CA | 1.0 | High |
| $CA_2$ | 0.5 | Very low |
| $CA_6$ | 0.17 | Inert |

An excessively high $C_{12}A_7$ content can result in premature setting of the calcium aluminate cement due to its high hydraulic reactivity.

The strength-forming hydration reaction between the CA phase and water occurs in principle as follows:

| | |
|---|---|
| $CA+10H \rightarrow CAH_{10}$ | Reaction 1 |
| $2CA+11H \rightarrow C_2AH_8+AH_3$ | Reaction 1.1 |
| $3CA+12H \rightarrow C_3AH_6+2AH_3$ | Reaction 1.2 |
| $2CAH_{10} \rightarrow C_2AH_8+AH_3+9H$ | Reaction 2 |
| $3C_2AH_8 \rightarrow 2C_3AH_6+AH_3+9H$ | Reaction 3 |
| $C_{12}A_7+51H \rightarrow 6C_2AH_8+AH_3$ | Reaction 4 |

The material and ambient temperature play a greater role in the hydration of calcium aluminate cements than for Portland cements. The formation of metastable $CAH_{10}$ according to Reaction 1 occurs preferably at temperatures of <10° C. At higher temperatures between 10° C. and 27° C. metastable $C_2AH_8$ and $AH_3$ form in addition to $CAH_{10}$ according to Reaction 1.1. At higher temperatures the stable hydrate $C_3AH_6$ increasingly forms according to Reaction 1.2. $C_{12}A_7$ preferably hydrates directly to $C_2AH_8$ and $AH_3$ according to Reaction 4. Reactions 2 and 3 show that primarily formed $CAH_{10}$ also gradually turns into $C_2AH_8$ and $C_3AH_6$ at temperatures of >10° C., associated with a substantial reduction in volume and the release of aluminium hydroxide and water.

Calcium aluminate cements are contained in a number of different construction chemical products. They are not so-called rapid setting cements. Their outstanding characteristic is that similar to Portland cement they first exhibit an inactive period of one to several hours after having been mixed with water. EN 14647 stipulates that in compliance with EN 196-3 the setting process may only commence at the earliest after 90 minutes. Calcium aluminate cements can therefore easily be used to make mortar and concrete and can also be transported. After setting, however, they undergo an extremely fast hydration in comparison to Portland cements, resulting in an extraordinarily high compressive strength development within only a few hours.

The calcium aluminate cements with a high and low iron content, such as those sold under the trade names Istra 40 (Calucem), Ciment Fondu (Kerneos), Electroland (Cementos Molins) as well as Gorkal 40 (Gorka) and Istra 50 (Calucem), SECAR 51 (Kerneos) as well as Gorkal 50 (Gorka) can, as tested on standard mortar according to EN 14647, already exhibit a compressive strength after six hours that corresponds to the compressive strength of Portland cements of quality class CEM I 32.5 or even quality class 42.5 after 28 days. However, as it is not permitted to use calcium aluminate cements for building construction in Germany, they are mainly used in construction chemical formulations, refractory mortars and concretes for the refractory industry and other special applications. Such applications are, for example, lining of drainage pipes if they are used for carrying acidic or aggressive water to which Portland cement does not provide sufficient resistance, or the solidification of problematic waste products and the demobilisation of pollutants that prevent or impede hardening of Portland cement. Calcium aluminate cements are also used for waste water processing, for example for desulphation, by the formation of low-solubility calcium alumino-sulphate hydrates.

The requirements specified in EN 14647 are based on the results of cement tests in compliance with EN 196-1 (Determination of strength), 196-2 (Chemical analysis), 196-3 (Determination of setting times and volume stability), 196-5 (Testing the pozzolanicity of pozzolanic cement), 196-6 (Determination of fineness) and 196-7 (Methods of taking and preparing samples). This patent states several test results in reference to the respective applicable section of the EN 196 standard.

As they result in short setting or hardening times when combined with Portland cements, calcium aluminate cements enable used as an accelerating component in a wide range of construction chemical formulations a precisely calculable setting or hardening behaviour of liquid levelling compounds, pastes, mortars and concretes ranging from a few minutes to hours after being mixed with water.

To achieve and precisely control additional properties such construction chemical formulations often contain a number of additional additions such as setting retarders and/or accelerators, plasticisers, consistency agents, fillers etc. that can be used to adjust the setting behaviour, lower the amount of water required to achieve a certain consistency, increase the water retention capacity and enhance the adhesive strength to certain materials, as is required, for example, for plasters, tile adhesives, floor levelling compounds and putty compounds. It is virtually impossible to compile a full list or almost full list of the construction chemical products available on the market. The development and optimisation of the corresponding formulations through to market maturity is normally very complex and time-consuming, and the exact formulations are therefore generally industrial secrets.

The use of the calcium aluminate cements with $Al_2O_3$ contents of around 40 to 50% is not possible for making purely white construction chemical products and specific coloured formulations such as plaster, levelling compounds, grouting mortars etc. for which the so-called "white cements" are available on the Portland cement side, as they are generally grey to grey-black or black (calcium aluminate cements containing iron) or beige, yellow-brown to light grey (low-iron calcium aluminate cements), cf. Taylor, "Cement Chemistry", 2nd edition, page 295 and Betoniek "High Alumina Cement", September 1998, page 2. For this reason the building construction industry has to fall back on the white calcium aluminate cement types available on the market to make pure white products.

The term "white" in the sense of the present invention refers to the value ranges determined in accordance with the L*a*b* system:
   L*: ≥88
   a*: −0.6 to +0.7
   b*: −0.6 to +2.5

The colour measurement within the scope of this patent is based on the "CIELab" L*a*b* colour system of the International Commission on Illumination CIE (Commission Internationale de l'Eclairage) of 1976. In this colour system the measured values designate colour spaces on three spatial coordinates. The value a* defines the colour space on the a axis with the complementary colours green and red. Negative values stand for green, positive values for red. The b* value defines a colour coordinate on the b axis between the complementary colours blue and yellow. Negative values stand for blue, positive values for yellow. The numeric range for a* and b* extends from −100 to +100. The L* value describes the colour-independent brightness (luminance) of the material. The L axis is vertical to the a and b axes and includes the "complementary grey colours" black (L*=0) and white (L*=100).

Measurement was carried out with a Konica Minolta Chroma Meter CR-400 on the surface of compacted, smoothed and crack-free powder samples in duplicate.

The white calcium aluminate cement "Ternal White" supplied by Kerneos, and the white Portland cements "Dyckerhoff Weiss-Contact-and-Decor" are recognised in the cement industry as pure white products and can therefore serve as a reference for the criterion "white". The following L*a*b* values are given for "Ternal White" on the Product Data Sheet (15/9/06): L*: 93-96; a*: −0.5<a*<0; b*: 0.8<b*<1.5. Similar colour values are also featured in products of the companies Gorka (Gorkal 70), Kerneos (SECAR 71, SECAR 80) or Almatis (CA-14, CA-270, CA-25) that are also used for construction chemical products. The following values are given for a* and b* for "Dyckerhoff Weiss" in the "brochure: Dyckerhoff Weiss—Starke Typen" for type "Contact": a*: approx. −0.6; b*: approx. 2.0 and for the type "Decor" the following values are given on the company website: L* 93; a* −0.6; b* 2.5. According to the manufacturer, with these values the white cement does not have any yellow or green cast.

The commercially available white calcium aluminate cement types generally have a limited hydraulic reactivity if they are mainly used for refractory applications due to their high $Al_2O_3$ contents and the resulting mineralogical composition that results from their lower monocalcium aluminate (CA) contents and their higher content of hydraulically low-reactive calcium dialuminate ($CA_2$).

In its pure form monocalcium aluminate (CA) contains 64.5% $Al_2O_3$. A calcium aluminate cement produced without the addition of $Al_2O_3$ with a higher $Al_2O_3$ content therefore contains less monocalcium aluminate (CA), and additionally calcium dialuminate ($CA_2$) with a higher $Al_2O_3$ content, Grossite, that is considerably less hydraulically reactive, cf. Taylor, "Cement Chemistry", 2nd edition, page 298 and "Lea's Chemistry of Cement and Concrete", 4th edition, 2004, page 727, and can only provide a low early setting contribution, if any at all. The monocalcium aluminate (CA) content is lowered even further in calcium aluminate cements to which fine hydraulically non-reactive $Al_2O_3$ is added to improve the refractory qualities, which in turn also increases the "white content" of this type of cement.

In the refractory industry, calcium aluminate cements are used as a binder for refractory concrete. They trigger the hardening after processing, as is the case with conventional concretes in the construction industry. Refractory concretes are defined as a mixture of hydraulic binders, fines and particles of fireproof aggregates. These materials comprise a hydraulic binder, normally calcium aluminate cement as well as fine and coarse particle aggregates such as fireclay and bauxite through to highly fireproof raw materials such as corundum, sintered alumina or silicon carbide.

Refractory concretes are processed by means of vibration, casting, ramming or spraying. After mixing with water they harden and are then prepared for use by means of a drying and heating process. Alongside the other constituent materials the quantity and type of binder determine important properties of the refractory concretes, such as its strength, shrinkage, abrasion resistance and especially their fire resistance.

The fire resistance of a refractory concrete is affected considerably by its chemical composition and the main components such as $Al_2O_3$ and/or MgO. The higher the ratio of these main components and the lower the content of secondary components such as CaO and contaminants such as alkalis or $Fe_2O_3$, the higher the fire resistance. For this reason, when manufacturing high-performance refractory concrete it is important to use only very pure calcium aluminate cements while at the same time minimising the quantities used of them.

The response to this demand over the past decades was the development of so-called deflocculated refractory concretes, the cement content of which was reduced to <5 percent by weight. In spite of the lower cement content, it is possible to achieve very positive processing properties by the use of suitable very fine raw materials such as reactive and/or calcined alumina, microsilica as well as suitable organic and/or inorganic additives while retaining or improving the strength development. The refractability of these high-performance refractory concretes is increased by the fact that they have a lower CaO content due to their lower cement content.

The following Table 2 shows the categorisation of the refractory concrete types according to DIN EN ISO 1927-1. While all calcium aluminate cement types are used in the regular cement castables (RCC), in the castable versions<2.5% CaO by weight the calcium aluminate cements containing 70% by weight $Al_2O_3$ are used. The term "castables" is now also in widespread use in Germany for refractory castables.

TABLE 2

Classification of refractory concretes according to DIN EN ISO 1927-1

| Classification | CaO content | Additional requirement |
| --- | --- | --- |
| Regular cement castables (RCC) | >2.5% | at least 2% fines <1 µm; no deflocculant |
| Medium cement castables (MCC) | >2.5% | — |
| Low cement castables (LCC) | 1.0 to 2.5% | — |
| Ultra low cement castables (ULLC) | 0.2 to 1.0% | — |
| No cement castables | <0.2% | — |

The task of the calcium aluminate cements in the refractory concretes after mixing with water is to first achieve the green strength and then ensure hardening while forming a hydraulic bonding. With increasing temperature the strength values generally pass through a minimum level that is considerably less pronounced with calcium aluminate cements than with Portland cements and that is less pronounced with a white, iron-free calcium aluminate cement with high a $Al_2O_3$ content≥70% by weight than in calcium aluminate cements with a high or low iron content. The start of transformation of the original hydraulic bonding to a ceramic bonding is indicated by another significant increase in the compressive strength and is reached at a temperature of approx. 1000° C., cf. Table 103. Salmang, Scholze: Keramik, 7th edition, 2007, Springer Verlag, page 762.

In particular calcium aluminate cements that have to meet high refractory requirements should not contain any substances that lower their melting point. Such substances are, for example, the previously mentioned alkali oxides $Na_2O$ and $K_2O$, but also iron oxide as $Fe_2O_3$ or FeO that is mainly responsible for the light to dark grey colouration of normal quality calcium aluminate cements containing iron or which are low in iron with 40 and 50% of $Al_2O_3$. Even very low levels of metallic iron already have an especially negative effect on the resistance of the refractory concretes to carbon monoxide CO.

The refractability of the calcium aluminate cements themselves is greater the higher their weight percentage of $Al_2O_3$ (A) is in relation to CaO (C), i.e. the higher their A/C value calculated on the basis of the weight percentage values of $Al_2O_3$/CaO of the chemical analysis. For this reason white calcium aluminate cements with a higher $Al_2O_3$ content are used in this field.

The following summary taken from "Lea's Chemistry of Cement and Concrete", 4th edition 2004, page 772, clearly shows this correlation:

| Rich in iron, grey: | A/C = 1.15 | PCE: 1270-1290° C. |
| Low in iron, brown: | A/C = 1.40 | PCE: 1430-1450° C. |
| Iron-free, white: | A/C = 2.50 | PCE: 1590-1620° C. |
| Iron-free, white: | A/C = 4.70 | PCE: 1770-1810° C. |

It can be seen that the PCE, a measurement of the refractability of a material, is shifted to higher temperatures with an increase in the A/C value of the calcium aluminate cements. "PCE" stands for Pyrometric Cone Equivalent.

The CaO content of refractory concretes mainly comes from the calcium aluminates in the calcium aluminate cement (CA, $CA_2$, $C_{12}A_7$). Hydraulically reactive, early strengthening calcium aluminates such as monocalcium aluminate (CA) have higher CaO contents than hydraulically non-reactive calcium dialuminate ($CA_2$). For this reason refractory concretes with a low CaO and a high $Al_2O_3$ content are preferred with regard to the refractability of the binder in refractory concretes.

Accordingly white calcium aluminate cements for the refractory industry contain less monocalcium aluminate (CA), the A/C value of which is 1.82 and instead contain portions of the calcium dialuminate ($CA_2$) phase with an A/C value of 3.64. If necessary pure $Al_2O_3$ is added with which the A/C value and therefore the refractability of the calcium aluminate cement can be improved even further.

However, decisive factors for the early hydraulic strength development and for the rheological and setting behaviours of calcium aluminate cements are calcium aluminates with a higher CaO content such as monocalcium aluminate (CA)—the main constitutent of calcium aluminate cements.

Consequently, the requirement on CaO content of calcium aluminate cement as a binder is contrary to the required CaO content in refractory concrete.

A calcium aluminate cement that is both iron-free and therefore white and suitable for the production of refractory concretes which exhibits at the same time the highest possible hydraulic, strength-forming reactivity is to date not available to users in the construction chemical industry and the refractory industry. The object of the present invention was therefore to provide such a calcium aluminate cement.

Surprisingly it was now found that a white calcium aluminate cement containing at least 90% by weight of monocalcium aluminate (CA) with an A/C value in the range of 1.75 to 2.0 that has been ground to a fineness of 3500 to 6000 cm$^2$/g and has a particle size distribution with a slope n in the range of 1.1 to 1.5 with a location parameter x' of 8-20 μm in an RRSB particle size grid meets the above requirements.

The present invention therefore relates to a white calcium aluminate cement containing at least 90% by weight of monocalcium aluminate (CA), with an A/C value in the range of 1.75 to 2.0, a fineness in the range of 3500 to 6000 cm$^2$/g, a slope n in the range of 1.1 to 1.5 and a location parameter x' of 8-20 μm in an RRSB particle size grid according to DIN 66145. The invention also relates to its use as a binder component in formulations of the refractory industry, the construction chemical industry and for all applications for calcium aluminate cement, in which the properties according to the invention are advantageous.

The calcium aluminate cement preferably contains less than 3% by weight of $C_{12}A_7$ and/or less than 7% by weight of $CA_2$. Its hydraulic reactivity at a comparable mortar consistency at least corresponds to commercially available calcium aluminate cements containing around 40 and 50% by weight of $Al_2O_3$, i.e. it has the same or even exceeds their very high compressive strength development, especially in the time range of up to 24 hours.

Its colour in the L*a*b* colour system is within the following range of values:
L*: 92±4, preferably 93±2
a*: −0.6 to +0.7
b*: −0.6 to +2.5

It was discovered that the calcium aluminate cement according to the invention surprisingly by has a number of advantages as a binder in known refractory formulations and construction chemical compositions.

These advantages result on the one hand from the fact that when the hydraulically highly active calcium aluminate cement according to the invention is used in refractory concrete, the binder content can be lowered considerably in comparison to previous formulations using iron-free calcium aluminate cements with 70 and 80% of $Al_2O_3$ without resulting in adverse processing properties, the compressive strength or the refractory properties. Due to the known refractory properties of the various calcium aluminates, disadvantages were to be expected when using the calcium aluminate cement according to the invention.

Due to the surprising properties of the calcium aluminate cement according to the invention its content in refractory materials and refractory concretes can be lowered so far that the content of monocalcium aluminate (CA) in these mortars and concretes is comparable to the level that is introduced into these refractory mortars by conventional white calcium aluminate cements with a high $Al_2O_3$ content while preventing the insertion of CaO by hydraulically non-reactive calcium aluminate phases such as calcium dialuminate ($CA_2$). As a result comparable or improved refractory properties of the refractory mortar and concretes are achieved.

It was also revealed that the flow properties of the known refractory formulations when using the calcium aluminate cement according to the invention instead of conventional state-of-the art calcium aluminate cements containing 70 and 80% by weight of $Al_2O_3$ are considerably improved. This is surprising, as the calcium aluminate cement according to the invention has relatively high values of 1.1-1.5 in the range of the slope n in the RRSB particle size grid according to DIN 66145. The calcium aluminate cement according to the invention, the production of which is shown in examples 1 and 2 and that was tested in examples 3 to 6, had a location parameter x' of 13.60 and a slope of n=1.29 at a fineness of 4323 cm$^2$/g. Its water demand was 39.0 percent, measured on paste according to EN 196-3.

The fundamental correlation between the water demand of a cement according to EN 196-3 and the specific surface according to Blaine as well as the location parameter x' and the slope n in the RRSB grid according to DIN 66145 has been thoroughly examined and is known, refer for example to S. Sprung, K. Kuhlmann, H.-G. Ellerbrock, "Korngrößenverteilung and Eigenschaften von Zement", Part II, ZKG Nr. 9/1985, page 530 and the VDZ Zementtaschenbuch 2002, item 5, page 139ff.

The location parameter x' in the RRSB particle size grid according to DIN 66145 refers to the particle size at which the proportion of particles larger than x' (in μ) is 36.8% and the proportion of particles smaller than x' is 63.2%. The slope n of the RRSB straight line is a unit of measurement for the range of the distribution. The higher the value of n, the narrower the range of the particle size distribution.

Due to the recognised fact that the water demand of a cement increases with an increase in the Blaine value and a decreasing location parameter x' of the particle size distribution and also rises with the same location parameter x' with a narrower range of particle size distribution, the improvement in the flow properties when the calcium aluminate cement according to the invention is used in formulations of both the refractory industry and also the construction chemical industry is unexpected.

With the calcium aluminate cement according to the invention it is possible to produce pure white and certain coloured construction chemical formulations with the highest possible hydraulic reactivity, also beyond the previously possible extent. At the same time the surprising property of the calcium aluminate cement according to the invention in this and other, i.e. not white formulations for construction chemicals, is that it improves the flow properties due to or in spite of its steep particle distribution curve while requiring a considerably smaller quantity.

A calcium aluminate cement according to the invention contains at least 90% by weight of CA, preferably 92% by weight or more, and particularly preferred 95% by weight or more. The $C_{12}A_7$ content is preferably 3% by weight or less, particularly 2% by weight or less and particularly preferred 1% by weight or less. The $CA_2$ content is preferably 7% by weight or less, particularly 6% by weight or less and particularly preferred 4% by weight or less.

The slope n in an RRSB particle size distribution grid for the calcium aluminate cement according to the invention is 1.1 to 1.5, preferably 1.15 to 1.4 and particularly 1.2 to 1.3. The location parameter x' is in the range from 8 to 20 μm, preferably in the range from 10 to 18 μm and particularly preferred in the range from 11 to 17 μm. The fineness in accordance with Blaine is in the range from 3500 to 6000 cm$^2$/g, preferably in the range from 4000 to 5000 cm$^2$/g and particularly in the range from 4200 to 4800 cm$^2$/g.

The calcium aluminate cement according to the invention can be smelted or sintered in a manner known per se from a precise mixture of raw material containing alumina and lime. Production in a smelter by means of a plasma process in an electric arc furnace is particularly suitable.

After cooling the clinker is ground in a manner known per se. The grinding system, duration and energy input are selected so that the required particle size distribution and fineness are achieved. If necessary, a sifting operation can also be applied. The cooled, fragmented calcium aluminate cement clinker is ground in suitable grinding plants according to EN 14647, section 5, generally without adding any further additives. Ball mills in which grinding balls of different sizes grind the material in a rotating, cylindrical mill body by means of rolling and dropping movements are generally suitable. Usually ball mill systems are equipped with mass flow controls and so-called wind sifters that remove the part of the cement that has reached the target fineness and the required particle size parameters from the grinding circuit. However, high-pressure grinding rolls that have lower energy requirements and that work on the basis of the pressure grinding principle, alone or combined with ball mill systems and vertical roller mills are also suitable. Cements ground in high-pressure grinding rolls and vertical roller mills have a narrower particle size distribution than cements ground by means of ball mills. It is also possible to adjust the particle size parameters according to the invention by mixing different cement batches from the same or different mill systems.

As the calcium aluminate cement according to the invention is also very suitable for use in refractory concretes in addition to having a very high hydraulic reactivity, the grinding of clinker according to the invention is preferred in systems in which the ball mill is equipped with alumina grinding elements instead of steel balls and is also provided with an alumina lining. A fluidised bed opposed jet mill is also suitable, for example. In this way the introduction of metallic iron is minimised and very low metal iron contents of below 100 ppm are achieved, which contributes to a particularly high CO resistance of the castables produced therewith.

Due to the advantageous properties, the calcium aluminate cement according to the invention is very suitable for the production of construction chemical products such as putty compounds, plaster, tile adhesives, repair mortars, liquid levelling compounds, floor levelling compounds, shotcrete mortars and concretes, concretes for pipe linings and also for solidifying problematic waste materials and demobilising pollutants as well as for use in desulphating processes for waste water treatment. The main elements of existing formulations can be retained to a substantial degree. Due to the good slump flow when using the calcium aluminate cement according to the invention in formulations, the content of liquefiers and plasticisers in existing formulations can be generally retained, while the dosage requirement for retarders either remains unchanged or is increased slightly due to the high hydraulic reactivity of calcium aluminate cement.

The calcium aluminate cement according to the invention is also very suitable for the production of castables and other products for the refractory industry. Modification of the formulations may be required and recommended in the way and to the extent deemed necessary by specialists on the basis of the reduction in binder on the one hand and the positive change in the flow properties on the other. By using the calcium aluminate cement according to the invention it is now possible in principle to transfer existing castables into refractory concrete categories with lower CaO contents in accordance with DIN EN ISO 1927-1. In this case it is advantageous that the iron content, calculated as $Fe_2O_3$, is preferably 0.3% by weight or less, particularly preferred 0.2% by weight or less, and especially 0.1% by weight or less.

The invention is explained by means of the following examples, without, however, being restricted to the particular embodiments described. As far as not otherwise stated or if not obvious from the context, the percentages refer to the weight, if in doubt to the total weight of the mixture.

The invention refers to all combinations of preferred embodiments, insofar as these are not mutually exclusive. If "around" or "approx." is used in connection with values, this means that values are included that can be at least 10% higher or lower, or 5% higher or lower and in all cases 1% higher or lower.

EXAMPLE 1

Clinker was produced on a three-phase 300 KVA electric arc system with a water-cooled furnace shell and three vertically arranged graphite electrodes with a diameter of 60 mm to produce calcium aluminate cement according to the invention. The raw materials used were fine-grained alumina, $Al_2O_3$ (SO 143, company DADCO) and burnt lime, CaO (Precal 30s, company SchäferKalk) with the chemical composition shown in Table 3.

TABLE 3

| Chemical composition of the raw materials | | |
|---|---|---|
| Raw materials | Alumina | CaO |
| Loss on ignition 1000° C. | 3.00% | 2.40% |
| $SiO_2$ | 0.00% | 0.13% |
| $Al_2O_3$ | 96.67% | 0.10% |
| $TiO_2$ | 0.00% | 0.00% |
| $Fe_2O_3$ | 0.01% | 0.03% |
| CaO | 0.00% | 96.59% |
| MgO | 0.00% | 0.75% |
| $Na_2O$ | 0.32% | 0.00% |
| $SO_3$ | 0.00% | 0.00% |

A homogenous mixture was made from the raw materials comprising 65% by weight of alumina and 35% by weight of CaO. The furnace was mainly run in electric arc mode and the smelt poured into 7.5 liter cast iron moulds with the dimensions 250×125×250 mm³. After external solidification of the smelt, the mould was removed and the ingot cooled at ambient temperature without any additional measures. The temperature of the smelt measured in 25 cast moulds when it was taken from the furnace ranged from 1640° C. to 1690° C. Using $Al_2O_3$ grinders and $Al_2O_3$ mill lining the cooled material was ground in a ball mill to various degrees of fineness according to Blaine and set to various fineness parameters.

White calcium aluminate cements are also on offer as products for the construction chemical industry and are advertised as meeting the quality parameters of traditional calcium aluminate cements. However, according to investigations by the inventors, the chemical and mineralogical composition of these calcium aluminate cements mainly corresponds to the qualities optimised for use in the refractory sector with $Al_2O_3$ contents of around 70%. The results of the mineralogical tests on several of these white calcium aluminate cements are shown together with the calcium aluminate clinker according to the invention (ETZ/K1 and ETZ/K2) in Table 4.

TABLE 4

| Mineralogical analyses of white calcium aluminate cements | | | | |
|---|---|---|---|---|
| | Phase analysis [%] | | | |
| Calcium aluminate cement | CA | $C_{12}A_7$ | $CA_2$ | A |
| CA-25R (Supplier - Almatis) | 40.7 | 4.9 | 10.2 | 44.2 |
| CA-270 (Supplier - Almatis) | 57.9 | 0.0 | 17.8 | 24.3 |
| SECAR 71 (Supplier - Kerneos) | 58.2 | 0.3 | 40.6 | 0.9 |
| TERNAL WHITE (Supplier - Kerneos) | 60.5 | 0.5 | 37.5 | 1.5 |
| SECAR 80 (Supplier - Kerneos) | 34.8 | 0.9 | 25.7 | 38.6 |
| GORKAL 70 (Supplier - Gorka) | 76.3 | 0.3 | 22.8 | 0.6 |
| ETZ/K1 | 95.4 | 0.4 | 3.7 | 0.5 |
| ETZ/K2 | 94.6 | 0.7 | 4.1 | 0.6 |

The data contained in Table 4 clearly show that the content of monocalcium aluminate (CA) in commercially available calcium aluminate cements with 70 and 80% by weight of $Al_2O_3$ or higher is significantly lower than in the calcium aluminate cement according to the invention. In SECAR 71 a CA content of approx. 58% by weight was found. In SECAR 80 approx. 40% by weight of alumina and correspondingly a CA content of 34.8% by weight was found. The relatively highest monocalcium aluminate content of 76% by weight was found in the sample of GORKAL 70, which, however, is still 19% below the calcium aluminate cement according to the invention.

Table 5 contains the chemical analyses of the calcium aluminate cement clinkers (ETZ 1 and ETZ 2) ground from the calcium aluminate cement clinkers ETZ/K1 and ETZ/K2 and the commercially available calcium aluminate cements of Table 4. The $K_2O$ content of all samples of Table 5 was 0.00% and is therefore no longer listed.

According to the standard EN 14647 the water demand for achieving the standard stiffness, the setting times on paste and mortar and the compressive strength on standard mortar was determined after 24 hours for both cements. In accordance with the specifications of EN 14647 the test procedure of EN 196-3 is applied to determine the standard stiffness and the water required. Determination of the compressive strength according to EN 14647 is carried out with standard mortar,

TABLE 5

Chemical analysis of white calcium aluminate cements

| Calcium aluminate cement | Chemical analysis [%] | | | | | | | LOI at 1000° C. |
|---|---|---|---|---|---|---|---|---|
| | $SiO_2$ | $Al_2O_3$ | $Fe_2O_3$ | CaO | MgO | $Na_2O$ | A/C | |
| CA-25R (company Almatis) | 0.04 | 80.51 | 0.07 | 18.44 | 0.05 | 0.15 | 4.37 | 0.72 |
| CA-270 (company Almatis) | 0.08 | 74.28 | 0.09 | 25.65 | 0.14 | 0.00 | 2.90 | 0.18 |
| SECAR 71 (company Kerneos) | 0.26 | 70.22 | 0.11 | 29.48 | 0.12 | 0.00 | 2.38 | 0.25 |
| TERNAL WHITE (company Kerneos) | 0.15 | 70.67 | 0.04 | 28.76 | 0.13 | 0.00 | 2.45 | 0.19 |
| SECAR 80 (company Kerneos) | 0.12 | 80.82 | 0.06 | 16.53 | 0.03 | 0.40 | 4.89 | 2.43 |
| GORKAL 70 (company Gorka) | 0.15 | 70.15 | 0.07 | 28.86 | 0.06 | 0.00 | 2.43 | 0.71 |
| ETZ 1 | 0.43 | 64.43 | 0.03 | 34.70 | 0.18 | 0.00 | 1.86 | 0.24 |
| ETZ 2 | 0.40 | 64.24 | 0.02 | 34.83 | 0.17 | 0.00 | 1.84 | 0.30 |

EXAMPLE 2

A calcium aluminate cement according to the invention (ETZ 1) and a calcium aluminate cement that is not according to the invention (ETZ 2) were ground from the calcium aluminate cement clinkers of example 1. Both cements were ground on a ball mill with $Al_2O_3$ grinding balls and $Al_2O_3$ mill lining. The calcium aluminate cement according to the invention was ground on a grinding system with separator, whereby the calcium aluminate cement not according to the invention was produced in continuous operation without sifting. As a primary differentiating feature to the calcium aluminate cement according to the invention and the calcium aluminate cement not according to the invention, a slope n of <1.1 in the RRSB particle size grid according to DIN 66145 was aimed at a comparable specific fineness according to Blaine.

the composition of which deviates slightly from the specifications of EN 196-1. With the same standard sand content of 1350 g, the mortar contains 500 g of calcium aluminate cement and 250 g of water. The setting times of the mortar were determined analogouls to the procedure specified in EN 196-3 on this standard mortar. The results of the tests are shown in Table 6. In addition Table 6 shows the values for the white, commercially available calcium aluminate cements examined in the same manner.

TABLE 6

Technical/physical data

| Calcium aluminate cement | Water [%] | Setting, paste [h:min] | | Setting, mortar [h:min] | | Compressive strength 24 hours [MPa] |
|---|---|---|---|---|---|---|
| | | Initial | Final | Initial | Final | |
| CA-25R | 24.8 | 0:45 | 0:55 | 0:30 | 0:40 | 40.6 |
| CA-270 | 22.0 | 12:00 | 14:40 | 4:10 | 4:15 | 78.7 |
| SECAR 71 | 26.0 | 5:45 | 6:40 | 2:50 | 2:55 | 76.0 |
| TERNAL WHITE | 28.6 | 3:55 | 8:30 | 00:40 | 1:25 | 69.6 |
| SECAR 80 | — | — | — | 1:30 | 2:20 | 20.3 |
| ETZ 1 | 39.0 | 08:00 | 11:00 | 03:50 | 04:15 | 76.1 |
| ETZ 2 | 28.0 | 1:30 | 2:05 | 00:15 | 00:35 | 62.9 |

In Table 7 the results of determining the fineness according to Blaine of the same calcium aluminate cements and the particle size parameters x' and n in the RRSB particle size grid according to DIN 66145 as well as the colour parameters in accordance with the L*a*b* system are summarized. The particle size parameters x' and n were determined with the laser granulometer HELOS with RODOS T4.1, company Sympatec GmbH.

TABLE 7

Particle size and colour parameters

| Calcium aluminate cement | Blaine [cm²/g] | x' [μm] | n | Colour parameter | | |
|---|---|---|---|---|---|---|
| | | | | L* | a* | b* |
| CA-25R | 8910 | 12.79 | 0.57 | 95.42 | −0.10 | 1.09 |
| CA-270 | 4120 | 16.39 | 0.68 | 93.86 | 0.00 | 0.38 |
| SECAR 71 | 4120 | 25.27 | 0.71 | 92.99 | 0.16 | 0.57 |
| TERNAL WHITE | 3890 | 24.85 | 0.85 | 94.01 | 0.00 | 0.59 |
| SECAR 80 | 8750 | 14.06 | 0.53 | 95.93 | −0.05 | −0.04 |
| GORKAL 70 | 4410 | 23.07 | 0.89 | 91.83 | 0.19 | 0.38 |
| ETZ 1 | 4323 | 13.60 | 1.29 | 93.08 | 0.27 | 0.66 |
| ETZ 2 | 4160 | 16.61 | 0.80 | 94.54 | 0.35 | 1.27 |

Table 6 clearly shows the relatively high water demand of the calcium aluminate cement according to the invention ETZ 1 of 39.0% for reaching the standard stiffness. At 28%, the calcium aluminate cement not according to the invention ETZ 2 is within the normal range. When looking at the corresponding particle size parameters in Table 7 it can be seen that the different water requirements are in particular due to the relatively high slope according to the invention of 1.29 of the calcium aluminate cement according to the invention and the moderate slope of 0.80 not according to the invention for the calcium aluminate cement not according to the invention. The measured slopes n of the commercially available, white comparison calcium aluminate cements are between 0.57 (CA-25R) and 0.89 (GORKAL 70). It can be seen that the Blaine values of these cements vary considerably.

The analyses carried out on commodities are random and do not constitute any representative average figures. However, according to experience, the European brand products have a high level of homogeneity, so that these tests can in fact be regarded as providing evidence of the composition of these cements over longer periods of time.

EXAMPLE 3

In accordance with the classification in DIN EN ISO 1927-1 "medium cement castables (MCC)", "low cement castables (LCC)" and "ultra low cement castables (ULCC)" were produced with the calcium aluminate cement according to the invention ETZ 1 and were tested for their processing and refractory properties. CA-270 (company Almatis) and SECAR 71 (company Kerneos) were used as a comparison binder in the respective refractory concretes. The dosage of the calcium aluminate cement according to the invention was decreased from medium to low values (10% max., 3% min.). These tests represent commercially conventional mixtures of other formulations. The composition of the formulations is shown in Table 8. The mineralogical composition and the chemical analysis of the calcium aluminate cements are shown in Tables 4 and 5.

The formulations comprise the calcium aluminate cements as a hydraulic binder, fines from reactive and calcined alumina and microsilica as well as sintered alumina (tabular alumina) in various particle sizes.

The calcium aluminate cement contents in the formulations were 10% (MTS1, MTS2, MTS3), 5% (MTS4, MTS5) and 3% (MTS6). Tests MTS1 to MTS3 served for direct comparison of the calcium aluminate cement according to the invention with SECAR 71 and CA-270 in an MCC. In tests MTS4 to MTS6 the performance of the calcium aluminate cement according to the invention was investigated. Test MTS5 differs from MTS4 by an approximately 10% lower water dosage. For MTS6 3% calcium aluminate cement according to the invention was used. When the calcium aluminate content according to the invention was lowered, the proportion of reactive and calcined alumina was increased in the formulation.

The castables were produced as follows: For each formulation MTS1 to MTS6 4000 g was taken from the raw materials and was weighed and homogenised in accordance with Table 8. The mixture was placed in the trough of a mortar mixer according to EN 196. When the mixer was switched on at level 1, the respective quantity of demineralised water was added gradually within 30 seconds. The mixing process was then continued for another 4 minutes at level 1.

TABLE 8

Refractory concrete formulations and properties

| Formulation | MTS 1 | MTS 2 | MTS 3 | MTS 4 | MTS 5 | MTS 6 |
|---|---|---|---|---|---|---|
| Total CaO content in the castable | 3.0% | 2.6% | 3.5% | 1.7% | 1.7% | 1.0% |
| Castable type according to DIN EN ISO 1927-1 | MCC | MCC | MCC | LCC | LCC | ULCC |
| Components | | | | | | |
| SECAR 71, Kerneos | 10.0% | | | | | |
| CA-270, Almatis | | 10.0% | | | | |
| ETZ 1 | | | 10.0% | 5.0% | 5.0% | 3.0% |
| Reactive alumina, company Almatis CL 370 | 2.5% | 2.5% | 2.5% | 3.5% | 3.5% | 3.5% |
| Calcined alumina CT 9 FG, company Almatis | 5.0% | 5.0% | 5.0% | 9.0% | 9.0% | 11.0% |
| Microsilica Q 1, company RW silicium GmbH | 2.5% | 2.5% | 2.5% | 2.5% | 2.5% | 2.5% |

TABLE 8-continued

Refractory concrete formulations and properties

| Formulation | MTS 1 | MTS 2 | MTS 3 | MTS 4 | MTS 5 | MTS 6 |
|---|---|---|---|---|---|---|
| Plasticiser Castament FS 60, company BASF | 0.1% | 0.1% | 0.1% | 0.1% | 0.1% | 0.1% |
| Tabular alumina T-60 0-0.5 mm, company Almatis | 14.9% | 14.9% | 14.9% | 14.9% | 14.9% | 14.9% |
| Tabular alumina T-60 0-1 mm, company Almatis | 27.5% | 27.5% | 27.5% | 27.5% | 27.5% | 27.5% |
| Tabular alumina T-60 1-3 mm, company Almatis | 20.0% | 20.0% | 20.0% | 20.0% | 20.0% | 20.0% |
| Tabular alumina T-60 3-6 mm, company Almatis | 17.5% | 17.5% | 17.5% | 17.5% | 17.5% | 17.5% |
| Water added to the dry mixture | 5.4% | 5.4% | 5.4% | 5.4% | 4.8% | 5.2% |

The slump flow of the refractory concrete was determined directly after the end of the mixing process by using a slump cone (EN 1015-3) and the vibration table A (EN 196-1). Determination of the slump flow serves to assess the processing behaviour. The slump cone was placed at the centre of the vibration table on the dry metallic plate. The refractory concrete was gradually filled under vibration over a period of 30 seconds. After that the slump cone was immediately detached and lifted off and another vibration period lasting 30 s was started. The diameter of the spread refractory concrete was then measured at right angles relative to one another and in two directions using the slide gauge, the measured values were rounded to 1 mm and the slump flow a5 was determined in mm. The measuring process was repeated in the same way on the refractory concrete stored in a protected place and the slump flows a15 and a30 were thus determined 15 and 30 minutes respectively after the start of mixing.

The refractory concretes were produced in the same manner as described above for the compressive strength test. Production of the standard prisms (4 cm×4 cm×16 cm) and measurement of the cold crushing strength and modulus of rupture was carried out according to EN 196-1. The prisms were stored under standard-compliant conditions for 48 hours in the air, then 24 hours at 110° C. in a dry cabinet and then cooled down to 20° C. These prisms were then used to determine the bulk density, the modulus of rupture and cold crushing strength after 110° C., the thermal treatment at 1000° C. and 1250° C. according to EN 1402-5 and to subsequently determine the bulk density. The cold flexural strength and cold compressive strength were determined according to EN 196-1.

The measurement results are summarised in Table 9.

TABLE 9

Properties of the castables

| Formulation | MTS 1 | MTS 2 | MTS 3 | MTS 4 | MTS 5 | MTS 6 |
|---|---|---|---|---|---|---|
| Slump flow a5 [mm] | 233 | 185 | 261 | 262 | 236 | 255 |
| Slump flow a15 [mm] | 235 | 153 | 245 | 247 | 214 | 245 |
| Slump flow a30 [mm] | 217 | 215 | 224 | 238 | 210 | 220 |
| Bulk density after 110° C. [g/cm$^3$] | 3.03 | 2.99 | 3.11 | 3.09 | 3.14 | 3.09 |
| Modulus of rupture after 110° C. [MPa] | 16.8 | 11.1 | 17.9 | 15.1 | 15.4 | 9.4 |
| Cold crushing strength after 110° C. [MPa] | 142.1 | 65.0 | 185.8 | 104.3 | 161.6 | 118.1 |
| Bulk density after 1000° C. [g/cm$^3$] | 2.97 | 2.94 | 3.02 | 3.02 | 3.08 | 3.05 |
| Modulus of rupture after 1000° C. [MPa] | 17.9 | 17.3 | 18.5 | 22.4 | 21.5 | 13.8 |
| Cold crushing strength after 1000° C. [MPa] | 130.6 | 93.3 | 147.5 | 145.2 | 153.6 | 135.1 |
| Bulk density after 1250° C. [g/cm$^3$] | 2.97 | 2.94 | 3.01 | 3.02 | 3.08 | 3.05 |
| Modulus of rupture after 1250° C. [MPa] | 18.2 | 19.4 | 20.2 | >23.3 | >23.3 | >23.3 |
| Cold crushing strength after 1250° C. [MPa] | 129.8 | 105.9 | 152.0 | 141.4 | 168.4 | 171.6 |

The mixtures MTS1 to MTS3 show that the calcium aluminate cement according to the invention in formulation MTS3 has the best slump flow at all test times with a constant cement and water content.

The modulus of rupture and cold crushing strength of MTS3 are considerably higher at all pretreatment temperatures in comparison to the mixes with the two commercially available calcium aluminate cements (MTS1 and MTS2).

Based on these results, dosage of the calcium aluminate cement according to the invention was gradually lowered to 5% (MTS4 and MTS5) and 3% (MTS6). The flow properties of MTS4 with 5% calcium aluminate cement according to the invention was better at all test times in comparison to MTS1, MTS2 and MTS3. The cold crushing strength after 1000° C. and 1250° C. for MTS4 with the halved content of 5% calcium aluminate cement according to the invention was slightly lower in comparison to MTS3 with 10% calcium aluminate cement according to the invention, but considerably higher than MTS1 and MTS2 with 10% commercially available calcium aluminate cements.

As MTS4 with a water content of 5.4% still had very good flow properties, the mixture MTS5 was repeated with a water content lowered by relative 10% to 4.8%. MTS5 evidenced a clear increase in the cold crushing strength with constantly good flow properties after all temperatures in comparison to MTS4.

In a subsequent step the cement content was lowered further in the direction of ultra low cement castable (MTS6). In this case it was surprisingly revealed that even with a reduction to 30% of the original quantity, which corresponds to a drop in the cement content by an absolute value of 7% in comparison to MTS3, excellent flow properties and the highest cold crushing strength was reached after preburning at 1250° C. The strength values of MTS6 are very clearly above those of the comparison cements especially after preburning at 1250° C., and therefore meet the demands placed on high-quality refractory concretes.

The results of tests on the refractory concretes MTS3 to MTS6 show that when the calcium aluminate cement according to the invention is used, the binder content in the conventional MCC, LCC and ULCC can be lowered and refractory concretes that are generally of higher quality compared to the state of the art can be produced.

EXAMPLE 4

In a refractoriness under load test according to DIN EN ISO 1893 the calcium aluminate cement according to the invention was compared with the commercially available calcium aluminate cement CA-270 (Company Almatis). The cement content in the formulations was selected with 5% CA-270 and 3% calcium aluminate cement according to the invention, so that in both formulations the content of monocalcium aluminate (CA) was the same at 2.9%. The aim of this approach was to standardise the content of hydraulically active, early compressive strength forming calcium aluminate phases. The total formulation with the CA-270 corresponded to MTS4 in Table 8. The entire formulation with the calcium aluminate cement according to the invention corresponded to MTS6 in Table 8. Deviating from this 4.0% water was used in both formulations. The thermal pretreatment for the cold compressive strength after 1000° C. was carried out according to EN 1402-5 and the determination of strength according to EN 196-1.

The refractoriness under load determines the softening behaviour of refractory materials at increasing temperatures under constant loads. $D_{max}$ states the maximum expansion of the test specimens at the temperature $T_{Dmax}$. On the basis of $T_{Dmax}$ the points T05 to T5 state temperatures at which the test specimens undergo deformation (compression) of 0.5% (T05), 1% (T1), 2% (T2) or 5% (T5). 0.2 MPa was selected as the constant load. The formulations and results of the refractoriness under load test are given in Table 10.

TABLE 10

Refractoriness under load according to DIN EN ISO 1893

|  | MTS 4 | MTS 6 |
|---|---|---|
| CA-270 (Company Almatis) | 5.0% |  |
| ETZ 1 |  | 3.0% |
| Monocalcium aluminate (CA) | 2.9% | 2.9% |
| Water added to the dry mixture | 4.0% | 4.0% |
| $T_{Dmax}$ [° C.] | 1328 | 1331 |
| $D_{max}$ [%] | 0.92 | 0.85 |
| T05 [° C.] | 1441 | 1442 |
| T1 [° C.] | 1459 | 1462 |
| T2 [° C.] | 1477 | 1481 |
| T5 [° C.] | 1522 | 1532 |
| Cold crushing strength after 1000° C. [MPa] | 166.5 | 203.0 |

The values T05 to T5 in Table 10 show that the calcium aluminate cement according to the invention possesses the same or a higher refractability in comparison with commercially available, white calcium aluminate cement CA-270 (company Almatis) with the same early strength forming monocalcium aluminate (CA) content of 2.9% in the formulation. The absolute calcium aluminate cement content according to the invention is only 60% of the content of commercially available calcium aluminate cement (CA-270, company Almatis).

EXAMPLE 5

Regular cement castables, RCC according to DIN EN ISO 1927-1 were produced with the calcium aluminate cement according to the invention using reactive alumina CL 370, calcined alumina CT 9 FG and tabular alumina T-60 (all company Almatis) as well as the plasticiser Castament FS 60, company BASF. The products were categorised as RCC in spite of the use of plasticisers as fines<1 μm were not added. Production, mixing and testing of the refractory concrete was carried out analogously to the processing in Example 3. SECAR 80 was used as a comparison cement. The dosage of the calcium aluminate cement according to the invention was decreased from high to medium values (20% max., 12.5% min.). The properties of the RCC with SECAR 80 were regarded as target values. Table 11 lists the formulations and results.

TABLE 11

Refractory concrete formulations, RCC

|  | Designation of the refractory concrete formulations | | |
|---|---|---|---|
|  | RA 1 | RA 2 | RA 3 |
| CaO content | 3.3% | 6.9% | 4.3% |
| Castable type in compliance with DIN EN ISO 1927-1* | RCC | RCC | RCC |
| FORMULATION |  |  |  |
| SECAR 80, Kerneos | 20.0% |  |  |
| ETZ 1 |  | 20.0% | 12.5% |
| Reactive alumina CL 370 | — | — | 1.5% |
| Calcined alumina CT 9 FG | — | — | 3.5% |
| Plasticiser | 0.3% | 0.3% | 0.3% |
| Tabular alumina 0-0.5 mm | 14.7% | 14.7% | 17.2% |
| Tabular alumina 0-1 mm | 30.0% | 30.0% | 30.0% |
| Tabular alumina 1-3 mm | 20.0% | 20.0% | 20.0% |
| Tabular alumina 3-6 mm | 15.0% | 15.0% | 15.0% |
| Added water | 8.3% | 6.3% | 6.6% |
| Slump flow a5 [mm] | 247 | 270 | 287 |
| Slump flow a15 [mm] | 246 | 240 | 262 |
| Slump flow a30 [mm] | 260 | 222 | 253 |

TABLE 11-continued

Refractory concrete formulations, RCC

|  | Designation of the refractory concrete formulations | | |
|---|---|---|---|
|  | RA 1 | RA 2 | RA 3 |
| Modulus of rupture after 110° C. [N/mm2] | 14.3 | 17.3 | 18.9 |
| Cold crushing strength after 110° C. [N/mm2] | 81.8 | >125 | >125 |
| Bulk density after 1000° C. | 2.80 | 2.92 | 2.97 |
| Modulus of rupture after 1000° C. [N/mm2] | 3.6 | 2.9 | 4.5 |
| Cold crushing strength after 1000° C. [N/mm2] | 48.8 | 69.1 | 96.1 |
| Bulk density after 1250° C. | 2.85 | 2.92 | 2.95 |
| Modulus of rupture after 1250° C. [N/mm2] | 2.8 | 2.4 | 2.8 |
| Cold crushing strength after 1250° C. [N/mm2] | 57.1 | 71.1 | 76.7 |

*Deviating from DIN EN ISO 1927-1 with plasticiser

It can be seen that in comparison with formulations RA1 and RA2 the calcium aluminate cement according to the invention has a better slump flow with 24% less added water. If the binder is decreased by 37.5% from 20% absolute to 12.5% in RA3, the positive flow properties remain unchanged with practically the same water content as RA2. The cold crushing strengths at all pretreatment temperatures in the formulations with the calcium aluminate cement according to the invention (RA2, RA3) are considerably higher than when the commercially available calcium aluminate cement is used.

EXAMPLE 6

Different construction chemical mixtures were produced with the calcium aluminate cement according to the invention as self-levelling compounds using commercially available binder components, additives and fillers that are typically used to produce tile cement, levelling compounds, putty compounds and repair mortar. Self-levelling compounds are very demanding products among the construction chemical formulations. On the one hand these formulations must have good to very good levelling properties throughout the processing time of 30 minutes, on the other they must have a high early strength and be quickly tread-proof. Generally the high-quality self-levelling compounds contain a high level of calcium aluminate cement.

The composition of the various formulations is fully reproduced in the three tables 12, 13 and 14. The formulation components are divided into the categories "binders", "additives I and II" and "fillers". Each of the three basic formulations were produced with three calcium aluminate cements: the calcium aluminate cement according to the invention, the white comparison cement SECAR 71 (company Kerneos) and the iron-rich comparison cement Istra 40 (company Calucem).

Each of the three mixtures were produced with two different binder contents and their consistency tested over a period of 30 minutes after production by measuring the slumps a5, a15 and a30 and also the compressive strength of standard prisms 4 cm×4 cm×16 cm was tested after 4, 6 and 24 hours. The terms and abbreviations used in Tables 12, 13 and 14 are explained below.

"Binders" is used for the formulation components: Portland cement (OPC) Dyckerhoff Weill Strong CEM I 52.5 R, company Dyckerhoff, calcium aluminate cement (CAC) and calcium sulphate (HH) Alpha—hemihydrate Special 40 W, company Casea.

"Additives I" refers to the additives with primarily retarding and accelerating effect: Tartaric acid L(+) p.a. (TA), company Neolab art. no. 5120; sodium carbonate wfr. p.a. (NaC), company Neolab art. no. 4750; and lithium carbonate, pure (LiC), company Merck art. no. 5670.

"Additives II" refers to the additives that primarily affect the consistency of the mixture: Calcium hydroxide p.a. (CH), company Neolab art. no. 3630; Plasticiser Melflux 2641F (PL), company BASF; Cellulose ether Culminal MHPC-500 PF (CE), company Ashland; and defoaming agent Agitan P 801 (DF), company Münzing Chemie GmbH.

Fillers (F) are inert materials that are not involved in the hydraulic reactions. Quartz sand F33 (F1), company Quarzwerke GmbH and quartz powder W3 (F2), company Quarzwerke GmbH were used in the examples.

All percentages given in Tables 12-14 refer to the percentage of a component of the entire weight of the mixture. The primary difference between the test series is the ratio of the binder components OPC, CAC and HH to one another.

All construction chemical mixtures were mixed with a constant water/solid value (W/S value) of 0.21.

No substantial changes were made within a formulation with a specified binder percentage except for variation of the calcium aluminate cement and slight adjustment of the retarder and calcium hydroxide contents necessary to adjust the start of the setting process of the prepared mixture to 40±5 minutes.

The slump was tested by weighing 2000 g of each of the dry formulation mixture that were mixed in a mortar mixer according to EN 196 with 420 g demineralised water for 30 seconds at level I then for 90 seconds at level II. The mixing water was placed in the mixing trough and then the dry mixture was added. The created pourable mixture was immediately distributed among three outlet rings, i.e. circular aluminium containers with a height of 35 mm and an inner diameter of 68 mm, that were centred on three Plexiglas flow plates provided with concentric graduations. Five minutes after mixing was started the first ring was lifted and the diameter of the circular mass determined as a mean value (a5) from two measurements taken vertically in relation to one another with the slide gauge. This procedure was repeated in the same way after 15 and 30 minutes with both other rings and the values a15 and a30 determined.

To determine the compressive strength after 4, 6 and 24 hours, the construction chemical mixtures were produced in the same way, and without carrying out any additional compression measures after the mixing process, the pourable materials were filled into prism moulds as specified in EN 196. The moulds were stored in compliance with EN 196 and the prisms tested in compliance with the standard at the specified times.

Table 12 compares the calcium aluminate cement according to the invention ETZ 1 with a SECAR 71 and an Istra 40 in a self-levelling compound with a high calcium aluminate content and a medium calcium sulphate content in the binder. The binder comprised 15% OPC, 60% CAC and 25% HH. The ratio of OPC/CAC was 0.25 and the ratio CAC/HH 2.40. The formulation was carried out with a binder content of 30% and 20%.

TABLE 12

Self-levelling compound with a high calcium aluminate content and medium calcium sulphate content.

| Calcium aluminate cement | ETZ 1 | Istra 40 | SECAR 71 | ETZ 1 | Istra 40 | SECAR 71 |
|---|---|---|---|---|---|---|
| Formulation | | | | | | |
| OPC [%] | 4.50 | 4.50 | 4.50 | 3.00 | 3.00 | 3.00 |
| CAC [%] | 18.00 | 18.00 | 18.00 | 12.00 | 12.00 | 12.00 |
| HH [%] | 7.50 | 7.50 | 7.50 | 5.00 | 5.00 | 5.00 |
| Binder total | 30.00 | 30.00 | 30.00 | 20.00 | 20.00 | 20.00 |
| Additive I | | | | | | |
| TA [%] | 0.21 | 0.11 | 0.11 | 0.14 | 0.07 | 0.07 |
| NaC [%] | 0.36 | 0.21 | 0.21 | 0.26 | 0.16 | 0.16 |
| LiC [%] | 0.03 | 0.03 | 0.03 | 0.02 | 0.02 | 0.02 |
| Additive II | | | | | | |
| CH [%] | 1.17 | 1.17 | 1.17 | 0.80 | 0.80 | 0.80 |
| PL [%] | 0.15 | 0.15 | 0.15 | 0.10 | 0.10 | 0.10 |
| CE [%] | 0.07 | 0.07 | 0.07 | 0.08 | 0.08 | 0.08 |
| DF [%] | 0.11 | 0.11 | 0.11 | 0.12 | 0.12 | 0.12 |
| Fillers | | | | | | |
| F1 [%] | 47.53 | 47.70 | 47.70 | 54.94 | 55.05 | 55.05 |
| F2 [%] | 20.37 | 20.45 | 20.45 | 23.54 | 23.60 | 23.60 |
| W/S value | 0.21 | 0.21 | 0.21 | 0.21 | 0.21 | 0.21 |
| Slump | | | | | | |
| a5 [mm] | 225 | 221 | 223 | 209 | 202 | 205 |
| a15 [mm] | 228 | 217 | 226 | 206 | 205 | 200 |
| a30 [mm] | 210 | 189 | 202 | 206 | 170 | 190 |
| Compressive strength | | | | | | |
| 4 h [MPa] | 28.3 | 7.1 | 18.5 | 16.0 | 5.4 | 11.3 |
| 6 h [MPa] | 28.6 | 7.4 | 23.6 | 17.3 | 10.9 | 14.3 |
| 24 h [MPa] | 32.0 | 7.4 | 28.1 | 20.7 | 11.5 | 17.8 |

The slumps determined for the self-levelling compound with a high binder content (30%) as well as for the surfacer with a low binder content (20%) show better flow properties and a significantly more pronounced early strength development up to 24 hours when the calcium aluminate cement according to the invention is used compared to the two commercially available comparison cements.

Table 13 compares the calcium aluminate cement according to the invention with a SECAR 71 and an Istra 40 in a self-levelling compound with a medium calcium aluminate content and a medium calcium sulphate content in the binder. The binder comprises 22.7% OPC, 54.6% CAC and 22.7% HH. The ratio of OPC/CAC was 0.42 and the ratio CAC/HH was 2.40. The formulation was carried out with a binder content of 30% and 25%.

TABLE 13

Self-levelling compound with medium calcium aluminate content and medium calcium sulphate content.

| Calcium aluminate cement | ETZ 1 | Istra 40 | SECAR 71 | ETZ 1 | Istra 40 | SECAR 71 |
|---|---|---|---|---|---|---|
| Formulation | | | | | | |
| OPC [%] | 6.82 | 6.82 | 6.82 | 5.68 | 5.68 | 5.68 |
| CAC [%] | 16.37 | 16.37 | 16.37 | 13.64 | 13.64 | 13.64 |
| HH [%] | 6.81 | 6.81 | 6.81 | 5.68 | 5.68 | 5.68 |
| Binder total | 30.00 | 30.00 | 30.00 | 25.00 | 25.00 | 25.00 |
| Additive I | | | | | | |
| TA [%] | 0.18 | 0.11 | 0.11 | 0.15 | 0.09 | 0.09 |
| NaC [%] | 0.33 | 0.21 | 0.21 | 0.28 | 0.18 | 0.18 |
| LiC [%] | 0.03 | 0.03 | 0.03 | 0.03 | 0.03 | 0.03 |
| Additive II | | | | | | |
| CH [%] | 1.17 | 1.17 | 1.17 | 0.98 | 0.98 | 0.98 |
| PL [%] | 0.15 | 0.15 | 0.15 | 0.15 | 0.15 | 0.15 |
| CE [%] | 0.07 | 0.07 | 0.07 | 0.08 | 0.08 | 0.08 |
| DF [%] | 0.11 | 0.11 | 0.11 | 0.11 | 0.11 | 0.11 |
| Fillers | | | | | | |
| F1 [%] | 47.57 | 47.70 | 47.70 | 51.25 | 51.36 | 51.36 |
| F2 [%] | 20.39 | 20.45 | 20.45 | 21.97 | 22.02 | 22.02 |
| W/S value | 0.21 | 0.21 | 0.21 | 0.21 | 0.21 | 0.21 |
| Slump | | | | | | |
| a5 [mm] | 228 | 223 | 224 | 230 | 218 | 213 |
| a15 [mm] | 230 | 234 | 213 | 231 | 213 | 220 |
| a30 [mm] | 211 | 202 | 178 | 193 | 156 | 199 |
| Compressive strength | | | | | | |
| 4 h [MPa] | 25.3 | 8.7 | 10.2 | 19.8 | 9.2 | 14.3 |
| 6 h [MPa] | 27.4 | 9.2 | 21.4 | 22.9 | 11.2 | 17.8 |
| 24 h [MPa] | 29.4 | 9.4 | 24.1 | 26.3 | 12.1 | 23.4 |

The calcium aluminate according to the invention also proved its advantageous properties in the formulation with the medium calcium aluminate content and a medium calcium sulphate content in comparison to the state of the art due to the greater slumps and the considerably higher early strength development up to 24 hours compared to the comparison cements Istra 40 and SECAR 71.

Table 14 compares the calcium aluminate cement according to the invention with a SECAR 71 and an Istra 40 in a self-levelling compound with a medium calcium aluminate content and a high calcium sulphate content in the binder. The binder comprises 20.4% OPC, 49.6% CAC and 30.0% HH. The ratio of OPC/CAC was 0.41 and the ratio CAC/HH 1.65. The formulation was carried out with a binder content of 30% and 20%.

Within the formulations with the high binder content of 30% the calcium aluminate cement according to the invention ETZ 1 was in addition compared to the calcium aluminate cement not according to the invention ETZ 2. The calcium aluminate cement not according to the invention was ground from the calcium aluminate cement clinker according to the invention ETZ/K2 whereby with a specific surface according to Blaine of 4160 cm$^2$/g, a location parameter x' of 16.61 and a slope n not according to the invention of 0.80 were adjusted.

TABLE 14

Self-levelling compound with medium calcium aluminate content and a high calcium sulphate content.

| Calcium aluminate cement | ETZ 1 | ETZ 2 | Istra 40 | SECAR 71 | ETZ 1 | Istra 40 | SECAR 71 |
|---|---|---|---|---|---|---|---|
| Formulation | | | | | | | |
| OPC [%] | 6.12 | 6.12 | 6.12 | 6.12 | 4.08 | 4.08 | 4.08 |
| CAC [%] | 14.88 | 14.88 | 14.88 | 14.88 | 9.92 | 9.92 | 9.92 |
| HH [%] | 9.00 | 9.00 | 9.00 | 9.00 | 6.00 | 6.00 | 6.00 |
| Binder content | 30.00 | 30.00 | 30.00 | 30.00 | 20.00 | 20.00 | 20.00 |
| Additive I | | | | | | | |
| TA [%] | 0.18 | 0.18 | 0.11 | 0.11 | 0.12 | 0.08 | 0.08 |
| NaC [%] | 0.33 | 0.33 | 0.21 | 0.21 | 0.24 | 0.16 | 0.16 |
| LiC [%] | 0.03 | 0.03 | 0.03 | 0.03 | 0.02 | 0.02 | 0.02 |
| Additive II | | | | | | | |
| CH [%] | 1.17 | 1.17 | 1.17 | 1.17 | 0.78 | 0.78 | 0.78 |
| PL [%] | 0.15 | 0.15 | 0.15 | 0.15 | 0.10 | 0.10 | 0.10 |
| CE [%] | 0.07 | 0.07 | 0.07 | 0.07 | 0.08 | 0.08 | 0.08 |
| DF [%] | 0.11 | 0.11 | 0.11 | 0.11 | 0.12 | 0.12 | 0.12 |
| Fillers | | | | | | | |
| F1 [%] | 47.57 | 47.57 | 47.70 | 47.70 | 54.98 | 55.06 | 55.06 |
| F2 [%] | 20.39 | 20.39 | 20.45 | 20.45 | 23.56 | 23.60 | 23.60 |
| W/S value | 0.21 | 0.21 | 0.21 | 0.21 | 0.21 | 0.21 | 0.21 |
| Slump | | | | | | | |
| a5 [mm] | 228 | 209 | 227 | 226 | 215 | 203 | 199 |
| a15 [mm] | 223 | 205 | 226 | 223 | 210 | 201 | 195 |
| a30 [mm] | 215 | 189 | 196 | 193 | 190 | 163 | 148 |
| Compressive strength | | | | | | | |
| 4 h [MPa] | 30.2 | 15.7 | 5.8 | 7.0 | 18.8 | 1.5 | 4.1 |
| 6 h [MPa] | 39.5 | 37.0 | 5.7 | 7.5 | 22.5 | 3.1 | 4.8 |
| 24 h [MPa] | 45.8 | 40.0 | 6.9 | 7.1 | 24.9 | 4.3 | 5.3 |

As in the formulations with medium and high calcium aluminate cement content and a medium calcium sulphate content, the use of calcium aluminate cement according to the invention in the formulation with a high calcium sulphate content proved also to be advantageous over the commercially available calcium aluminate cements SECAR 71 and Istra 40. In addition Table 14 shows with the example of the formulation with a high binder content (30%) that these advantages are considerably higher with a calcium aluminate cement made of the clinker according to the invention when the slope n=1.29 according to the invention than can be achieved with a slope n=0.80 that is not according to the invention.

The invention claimed is:

1. White calcium aluminate cement wherein it contains at least 90% by weight of monocalcium aluminate, an A/C value in the range of 1.75 to 2.0, a fineness according to Blaine in the range of 3500 to 6000 cm$^2$/g, a slope n in the range of 1.1 to 1.5 and a location parameter x' of 8-20 μm in an RRSB particle size grid according to DIN 66145.

2. Calcium aluminate cement according to claim 1, wherein it contains ≤3% by weight of $C_{12}A_7$.

3. Calcium aluminate cement according to claim 1, wherein it contains ≤7% by weight of $CA_2$.

4. Calcium aluminate cement according to claim 1, wherein it contains ≥92% by weight of CA.

5. Calcium aluminate cement according to claim 1, wherein its colour in the L*a*b* colour system is within the value ranges: L*=92±4, a*=−0.6 to +0.7 and b*=−0.6 to +2.5.

6. Calcium aluminate cement according to claim 1, wherein it contains ≤0.3% by weight of iron, calculated as $Fe_2O_3$.

7. Calcium aluminate cement according to claim 1, wherein the slope n is in the range of 1.15 to 1.40.

8. Calcium aluminate cement according to claim 1, wherein the location parameter x' is in the range of 10 to 18 μm.

9. Calcium aluminate cement according to claim 1, wherein it has a fineness according to Blaine in the range of 4000 to 5000 cm$^2$/g.

10. Calcium aluminate cement according to claim 1, wherein it contains ≤1% by weight of $C_{12}A_7$.

11. Calcium aluminate cement according to claim 1, wherein it contains ≤4% by weight of $CA_2$.

12. Calcium aluminate cement according to claim 10, wherein it contains ≤4% by weight of $CA_2$.

13. Calcium aluminate cement according to claim 1, wherein it contains ≥95% by weight of CA.

14. Calcium aluminate cement according to claim 12, wherein it contains ≥95% by weight of CA.

15. Calcium aluminate cement according to claim 1, wherein its colour in the L*a*b* colour system is within the value ranges: L*=93±2, a*=−0.6 to +0.7 and b*=−0.6 to +2.5.

16. Calcium aluminate cement according to claim 1, wherein it contains ≤0.1% by weight of iron, calculated as $Fe_2O_3$.

17. Calcium aluminate cement according to claim 14, wherein it contains ≤0.1% by weight of iron, calculated as $Fe_2O_3$.

18. Calcium aluminate cement according to claim 1, wherein the slope n is in the range of 1.20 to 1.30 and the location parameter x' is in the range of 11 to 17 μm.

19. Calcium aluminate cement according to claim 14, wherein the slope n is in the range of 1.20 to 1.30 and the location parameter x' is in the range of 11 to 17 μm.

20. Calcium aluminate cement according to claim 16, wherein the slope n is in the range of 1.20 to 1.30 and the location parameter x' is in the range of 11 to 17 μm.

21. Calcium aluminate cement according to claim 1, wherein it has a fineness according to Blaine in the range of 4200 to 4800 cm$^2$/g.

* * * * *